United States Patent [19]
Bianchi

[11] Patent Number: 5,183,285
[45] Date of Patent: Feb. 2, 1993

[54] SUSPENSION PROCESS AND APPARATUS OF THE TYPE HAVING DIFFERENT STIFFNESSES WITH PROVISION TO SMOOTH THE CHANGE FROM ONE STIFFNESS TO ANOTHER

[75] Inventor: Mauro Bianchi, La Garde Freinet, France

[73] Assignee: Mauro Bianchi S.A., Puteau, France

[21] Appl. No.: 726,987

[22] Filed: Jul. 8, 1991

[30] Foreign Application Priority Data

Jul. 6, 1990 [FR] France .................. 90 08859

[51] Int. Cl.⁵ ............................................... B60G 11/00
[52] U.S. Cl. .................................... 280/670; 280/710; 280/714
[58] Field of Search ............... 280/670, 675, 707, 708, 280/710, 714; 267/34, 64.15

[56] References Cited

U.S. PATENT DOCUMENTS

| | | | |
|---|---|---|---|
| 3,002,743 | 10/1961 | Sampietro et al. | 267/64.15 |
| 3,297,312 | 1/1967 | Hines | 267/34 |
| 3,720,425 | 3/1973 | Asano et al. | 280/708 |
| 4,415,146 | 11/1983 | Sitko | 267/96 |

FOREIGN PATENT DOCUMENTS

| | | |
|---|---|---|
| 0318816 | 6/1989 | European Pat. Off. . |
| 0371196 | 6/1990 | European Pat. Off. . |
| 630427 | 5/1936 | Fed. Rep. of Germany . |
| 349582 | 5/1931 | Fed. Rep. of Germany . |
| 2351829 | 4/1975 | Fed. Rep. of Germany . |
| 1052883 | 1/1954 | France . |
| 1376235 | 9/1964 | France . |
| 2125217 | 9/1972 | France . |
| 2582592 | 12/1986 | France . |
| 1228842 | 4/1971 | United Kingdom . |
| 1331782 | 9/1973 | United Kingdom . |
| 2164417 | 3/1986 | United Kingdom . |

*Primary Examiner*—Kenneth R. Rice
*Attorney, Agent, or Firm*—Young & Thompson

[57] ABSTRACT

A suspension for the wheels of a motor vehicle, the suspension having an operating load position in which the suspension is deformed by a force equal to the weight of the vehicle, a suspended wheel position in which the suspension is deformed by a force less than the weight of the vehicle and a collapsed position in which the suspension is deformed by a force greater than the weight of the vehicle. The suspension has a stiffness that is greater between the operating load position and the suspended wheels position than between the operating load position and the collapsed position. A gradual transition is provided between these stiffnesses.

18 Claims, 16 Drawing Sheets

FIG_1

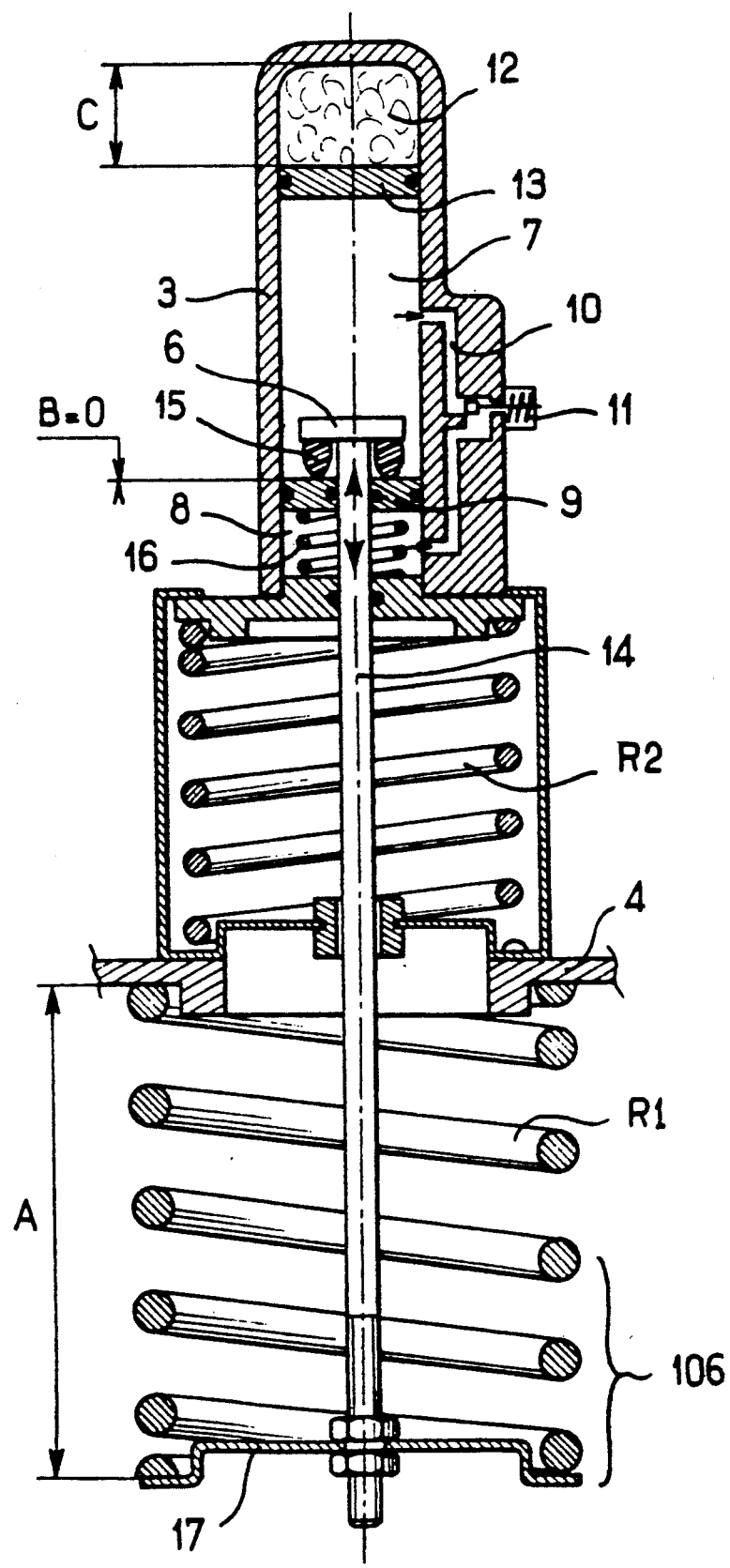
FIG_7

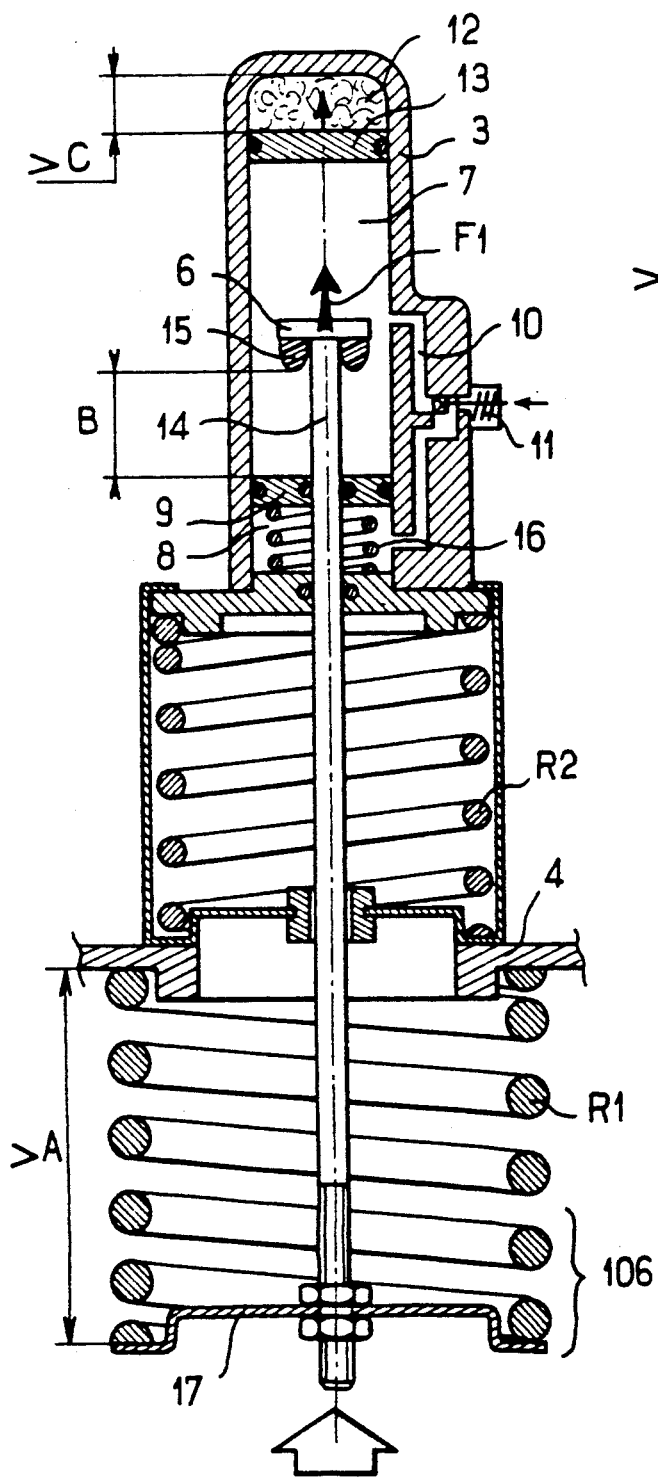
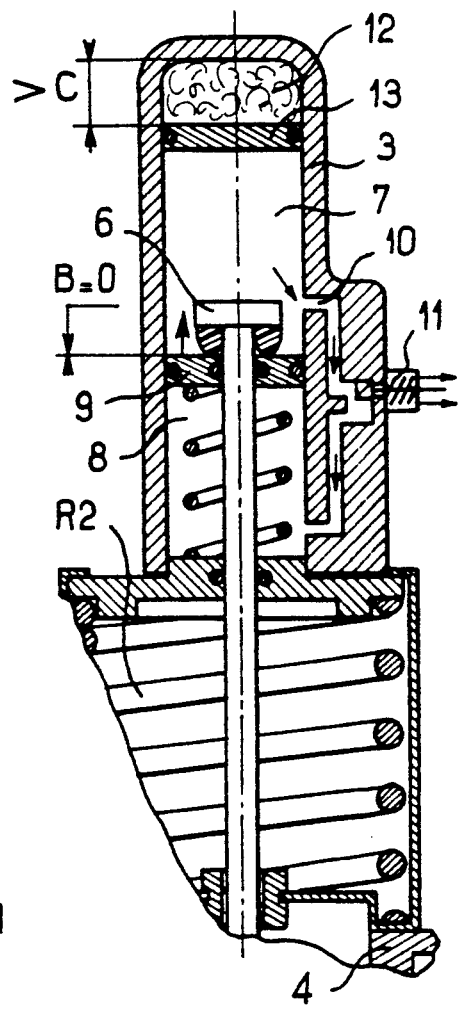
FIG_8
FIG_9

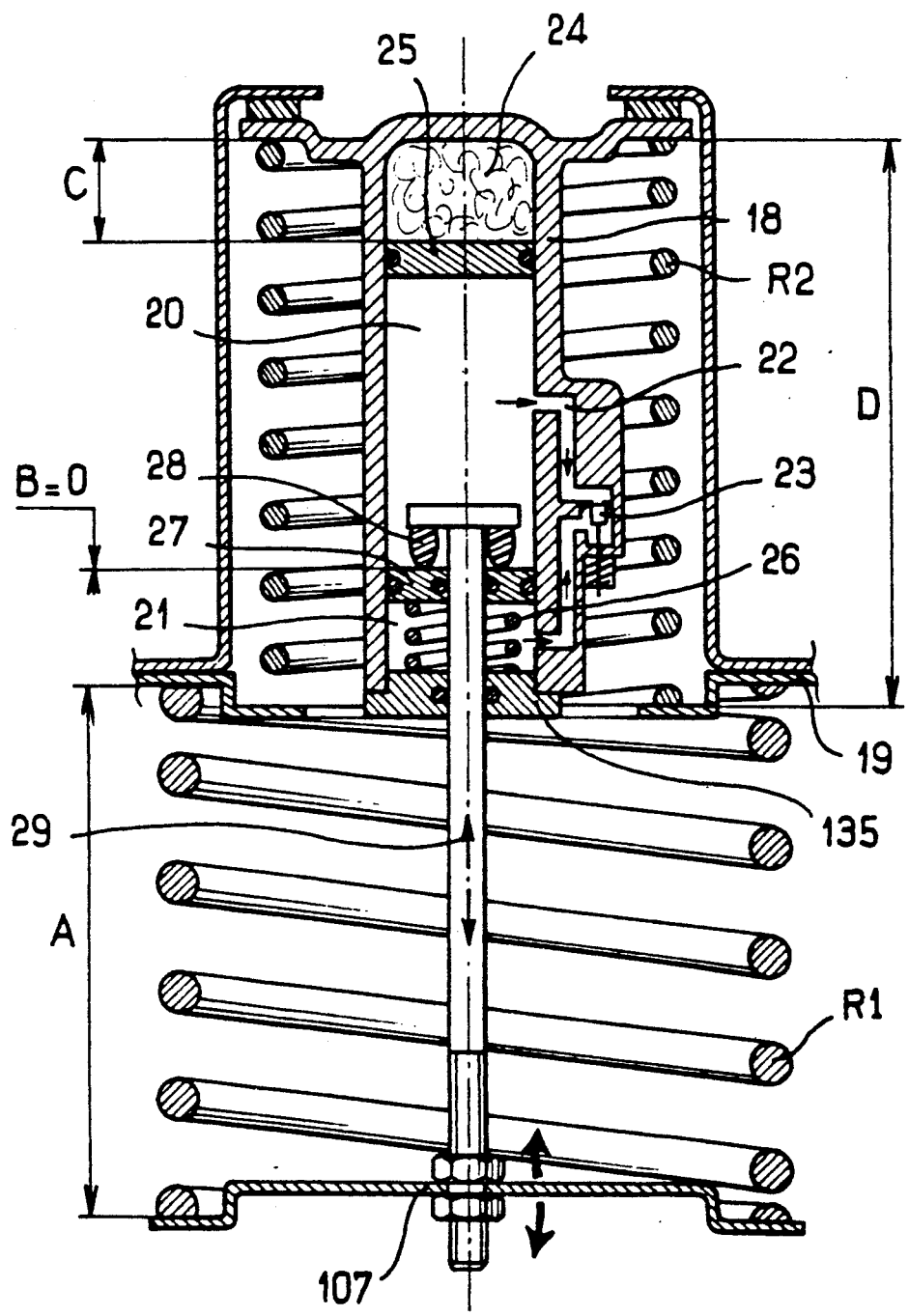
FIG_10

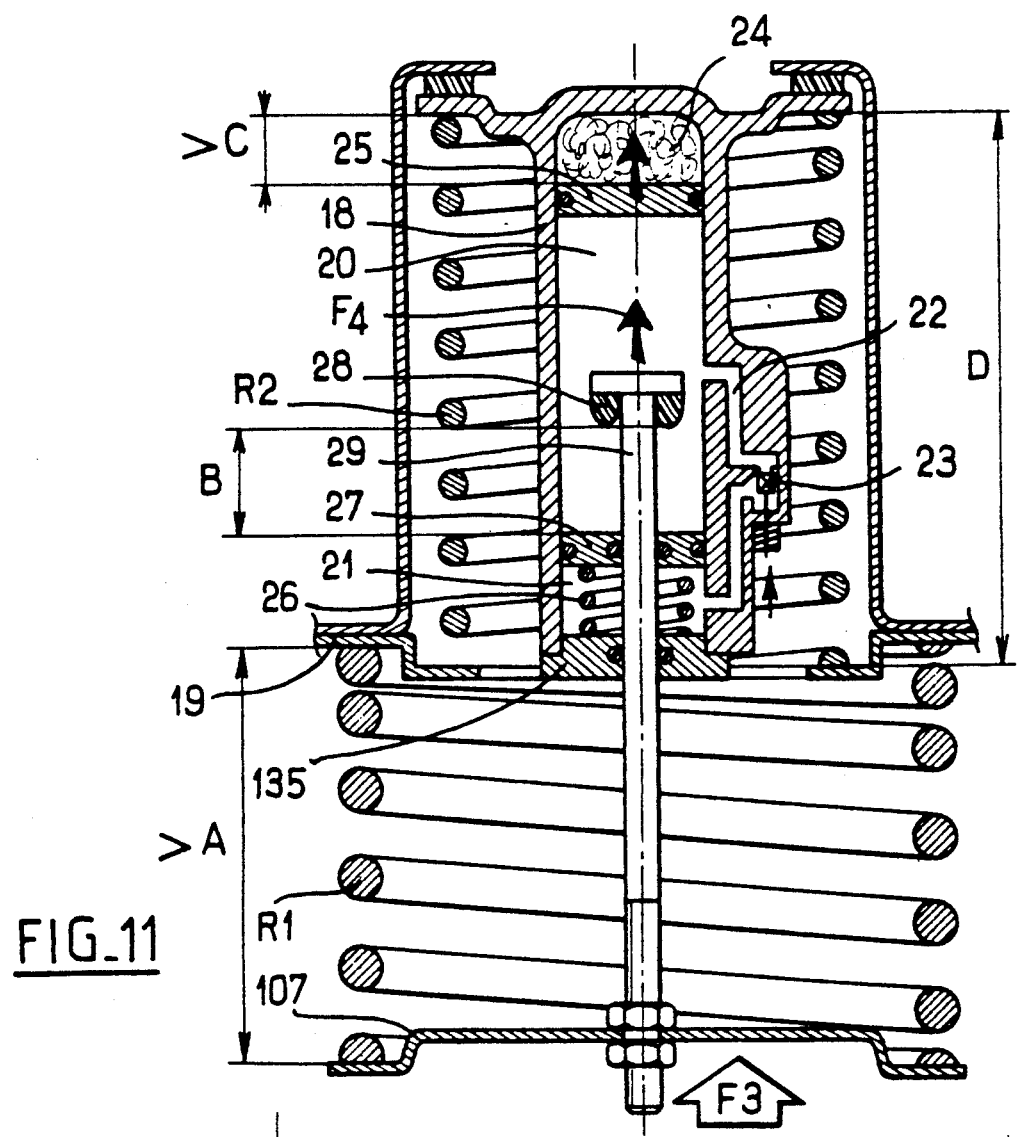
FIG_11
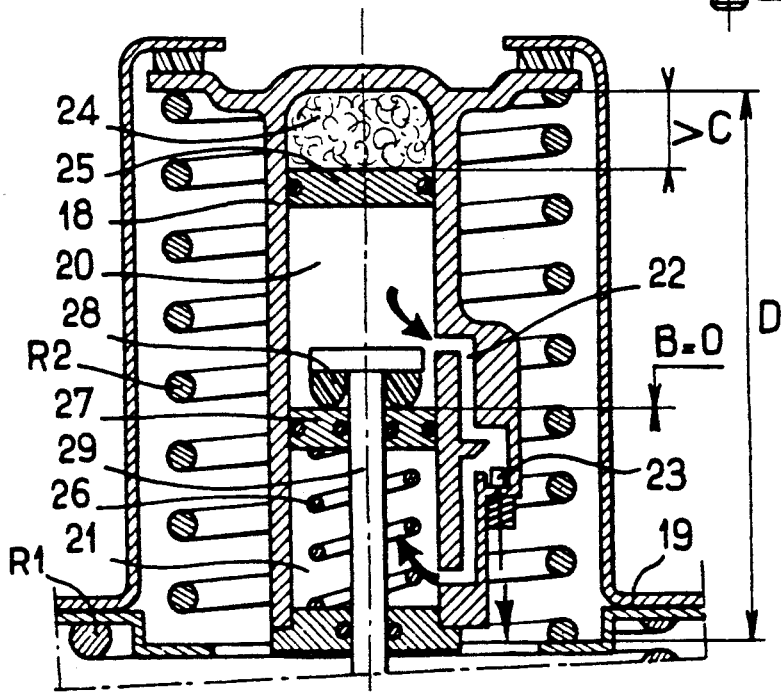
FIG_12

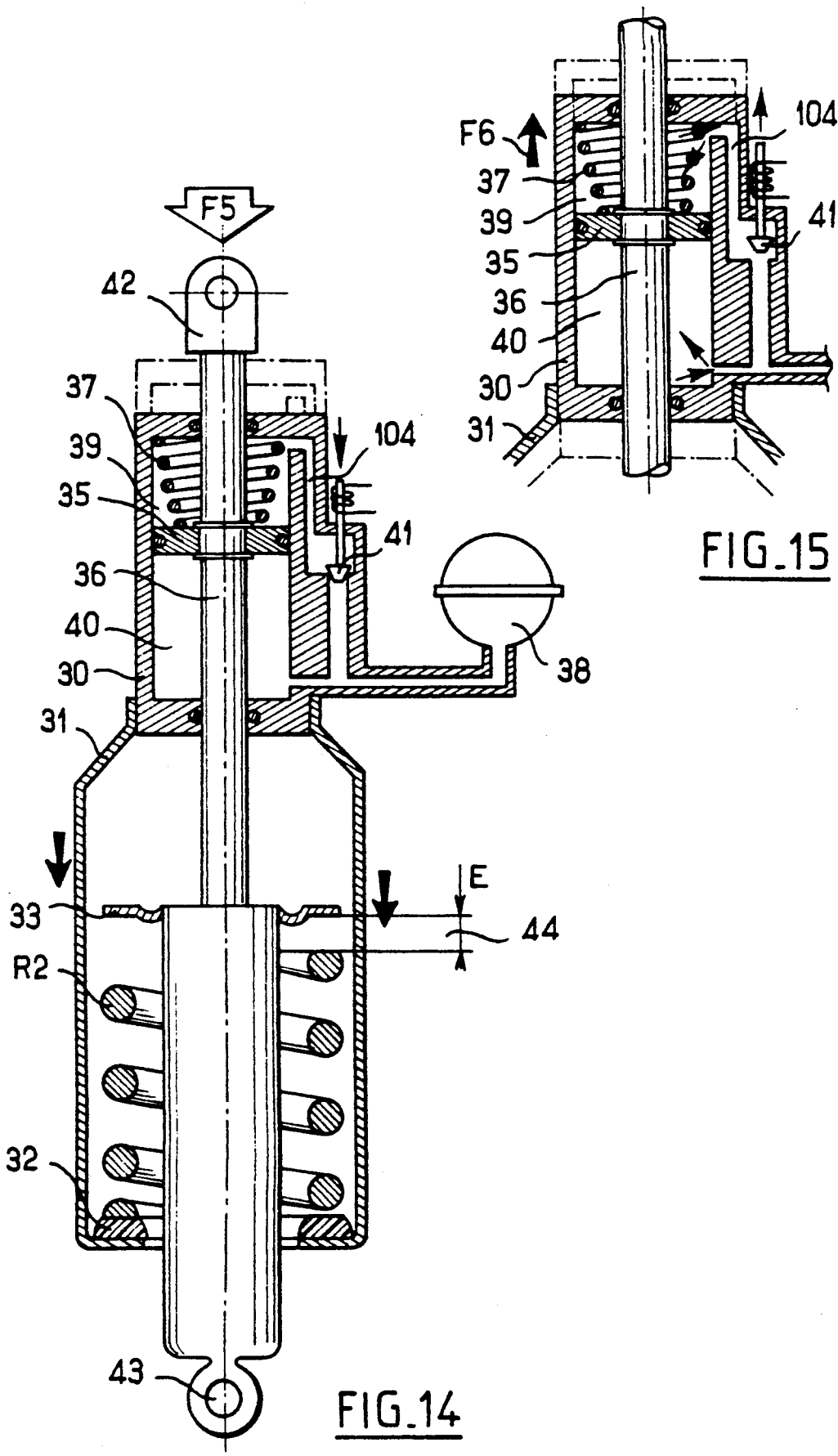

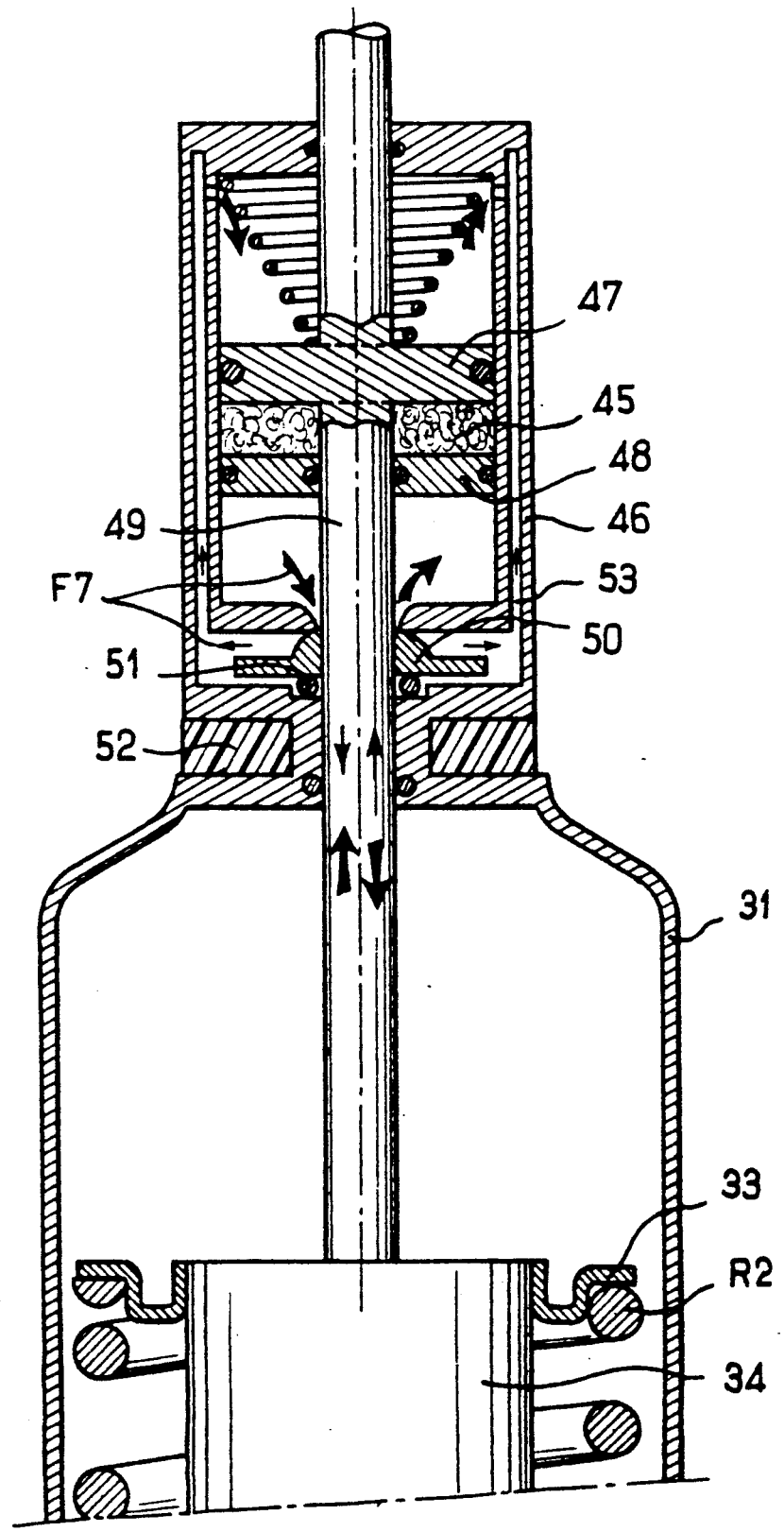
FIG_16

FIG_18

FIG_19

SUSPENSION PROCESS AND APPARATUS OF THE TYPE HAVING DIFFERENT STIFFNESSES WITH PROVISION TO SMOOTH THE CHANGE FROM ONE STIFFNESS TO ANOTHER

The object of the invention is to provide a suspension and a suspension process which utilize a greater stiffness in the region of "rebound" than in the region of "bump" comprising means for smoothing the stiffness from the passage of one region to the other, and means for varying the reference position for "operating load" as a function of the number of persons and the load in the vehicle when said vehicle is not equipped with a plate-correction device.

The state of the prior art can be defined by the following patent applications

French Patent Appln. No. 89.06533 filed on May 16, 1989 which describes a suspension process and a suspension. It consists in sandwiching the vehicle chassis between two independent suspensions disposed in opposition, one classical, so-called suspension with "negative" flexibility, the other suspension with "positive" flexibility. The suspension with "positive" flexibility is mounted in opposition to that with a "negative" flexibility.

Regulating means permit the simultaneous regulation of the prestressed suspension with "negative" flexibility and of the suspension with "positive" flexibility.

French Patent Appln. No. 89.13240 filed on Oct. 5, 1989 which describes a suspension with flexibility or stiffness dynamically variable. The suspension process utilizes one of several elastic elements mounted in opposition one with respect to the other, in such a manner as to set to the suspension of the vehicle variation of stiffness or of flexibility to one of several slopes on the curve (shock-expansion and work of compression) and said use of different stiffnesses or flexibilities is localized during the wheel clearances of the suspension.

According to the invention, the process for smoothing the passage from one stiffness to the other consists in using an additional elastic element which acts as a progressive abutment mounted in series with the additional suspension spring. The stiffness of said additional elastic element increases rapidly towards an asymptotic value.

According to one embodiment, the additional elastic element mounted in series with the auxiliary spring is a rubber support ring which is provided with an internal abutment which defines the exact intervention path of the said elastic ring.

The stiffness of the elastic ring can vary by cutting one or several horizontal holes in the median part.

Auxiliary mechanical springs of the helicoidal type can have different characteristics, one part may have a linear flexibility, the other part may have, due to its structure, a variable flexibility.

The springs may be utilized as a means for smoothing the passage from one stiffness to another stiffness.

According to other embodiments, the additional progressive abutments on the auxiliary spring are provided with a stiffness curve with a proper asymptote.

According to another embodiment, the means for smoothing the passage from one stiffness to the other, consists in utilizing an auxiliary spring with variable flexibility. These auxiliary springs with variable flexibility are often springs of the pneumatic or oleopneumatic type.

The elastic element of the auxiliary spring receives an initial pressure.

According to the invention it is essential to position the break point between the two slopes or the two stiffnesses in such a way that the break point becomes rounded off.

It is indispensable to readjust the prestressed suspension as a function of the load or to adjust the stiffness breaking point during each of the load variations of the vehicle.

This means of regulating will come into play where the vehicle is not equipped with a correcting plate.

According to an embodiment where one uses two springs (one the principal sustentation spring, the other, the auxiliary spring mounted in opposition), the regulating means is a hydraulic jack disposed as an "interface" between the movable portions of the suspension (classic) and the auxiliary spring according to the invention.

The rod of the movable piston is secured to the suspension whereas the body of the jack bears on the auxiliary spring, the jack is provided with two upper and lower chambers on the piston which intercommunicate with one another via a passageway through which the passage of oil is controlled by an electrovalve, the jack comprises in its upper part a compressed gas reservoir maintaining the oil used under pressure by means of a separate floating piston disposed between this reservoir and the upper chamber; the lower chamber contains a bearing spring, the head of the piston is freely mounted on the rod which comprises only one end abutment of the rod which serves as an abutment for progressively applying bearing force.

The electrovalve opens the oil passage between the two chambers to permit adjustment after loading such that the piston will bear against the abutment of the rod, the electrovalve is closed during this travel.

According to another embodiment, the auxiliary spring mounted in opposition to the principal sustentation spring is mounted coaxially with the hydraulic jack which is disposed at the "interface" between the movable portion of the classical suspension or of the suspension spring and the auxiliary spring.

According to another embodiment, the process combines a shock absorber with an auxiliary spring "CONTRACTIVE" with automatic correction means of the point of attack.

The body of the jack is secured to a casing carrying the abutment upon which the auxiliary spring comes into bearing relation. This auxiliary spring is secured, at its other end, to a bearing abutment, of the shock absorber body. The piston of the jack is secured to the rod of the shock absorber. An internal bearing spring tends to raise the body of the jack, hence the assembly of the jack and casing, relative to the piston, and therefore relative to the rod of the shock absorber. A small pressurization element (accumulator) continuously ensures the complete filling of the jack.

The jack is divided into two chambers separated by the piston which is secured to the rod of the shock absorber, the two chambers communicate through a passageway which is controlled by a pressurization electrovalve, the upper chamber is provided with a bearing spring, a pressurization element is connected to the passageway which connects the two chambers such that the assembly of the jack and casing of the auxiliary spring is displaced by the abutment spring upon opening of the electrovalve for adjustment as a function of the load.

According to another embodiment where the piston is fixed on the rod, the pressurization gas is enclosed in the jack between the piston and a floating piston traversed by the rod of the shock absorber; the electrovalve is integrated in the body of the jack in the form of a valve member held in abutment on its seat by an O-ring which serves as a joint and spring for holding said valve. This valve member leaves its seat when the solenoid, which is situated below, is actuated.

The oil can then move between the top and bottom of the jack making use of the annular space peripheral to the jack.

When the solenoid is not actuated, the valve member remains closed and the jack is locked.

The accompanying drawings are presented by way of examples and are not to be construed as limiting. They represent preferred embodiments of the invention. They will permit easy understanding of the invention.

FIG. 2 depicts a stiffness curve from an assembly with two springs.

FIG. 3 depicts a stiffness curve where a progressive abutment is used.

FIG. 4 depicts a curve from an assembly enriched with an abutment of progression.

FIG. 5 depicts a stiffness curve from an assembly utilizing a spring with variable flexibility.

Figure 6:
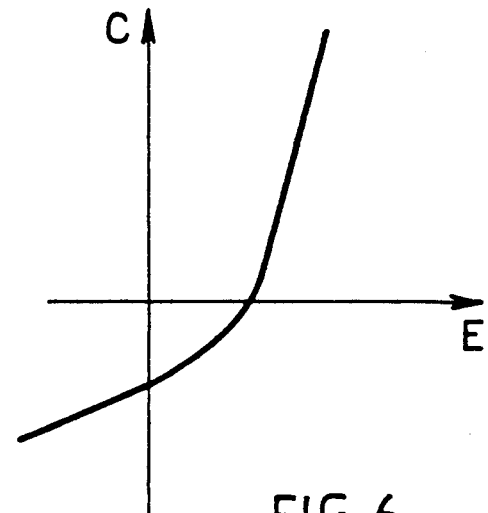

FIG. 6 depicts a stiffness curve from an assembly utilizing a spring of the pneumatic or oleopneumatic type. A compromise may be obtained by establishing an initial pressure in the elastic element. One then observes a break in the curve which nevertheless is less severe than in the case where two mechanical springs are used.

These arrangements meet the concern of safeguarding the comfort aspect of the vehicle whereas the basic solution, without smoothing or rounding off the breaking point of the stiffness curve, is more directed towards the quest for proper handling, which is the case in sport vehicles.

FIG. 7 is a schematic view of an embodiment for the automatic correction of the attack point of the auxiliary spring, and in a manner, to readjust the prestressed suspension as a function of the load; in other words, to adjust the breaking point of stiffness during each of the variations of the load of the vehicle. The regulating means is a hydraulic jack placed in interface between the movable portion of the elastic suspension and the auxiliary spring. In this embodiment, the piston rod is secured to the suspension while the body of the jack bears on the auxiliary spring. The piston is freely mounted on the rod which only provides for one abutment at the end of the rod, which acts as a progressive bearing abutment.

FIG. 8 is a view of an embodiment represented by FIG. 7 where the electrovalve is closed and the vehicle is loaded in the direction of the arrows, the rod sinks, the auxiliary spring is liberated.

FIG. 9 is a detailed view of FIG. 7 and 8 where, after the load of the vehicle, the electrovalve is opened, the piston rises to place itself in contact with the abutment of the rod under the effect of the push of the bearing spring. After this adjustment, the electrovalve is closed.

FIG. 10 depicts another embodiment where the auxiliary spring is mounted coaxially around the hydraulic jack.

FIG. 11 depicts another embodiment of FIG. 10, but where the vehicle is loaded, the rod sinks into the jack, the electrovalve is closed.

FIG. 12 depicts another embodiment of FIGS. 10 and 11 where the electrovalve is open to permit the repositioning of the piston in bearing relation in the jack and without the effort of the bearing spring.

Figure 13:
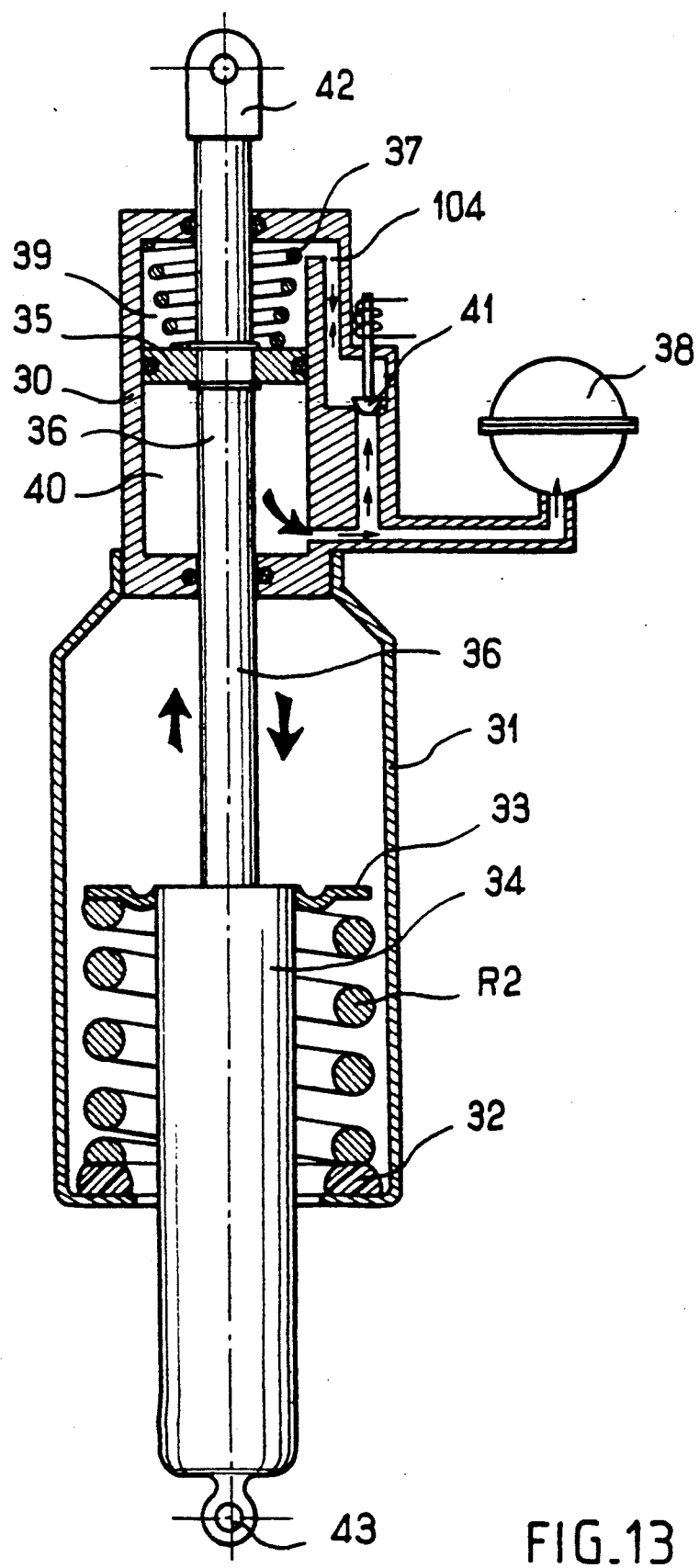

FIG. 13 depicts an embodiment where the hydraulic jack is placed between the head of the piston fixed at one end on the rod of the shock absorbers while the body of the jack extends by a chamber of the auxiliary spring which comes coaxially to surround the body of the shock absorbers on which the chamber is slidingly mounted.

FIG. 14 is a view of an embodiment depicted in FIG. 13 where the electrovalve is closed and where the vehicle is loaded, (see the arrows which indicate the air gap which exists, thereby liberating the auxiliary spring).

FIG. 15 is a detailed view of an embodiment depicted in FIGS. 13 and 14 but where the electrovalve is open in such a manner as to permit the regulation or the adjustment.

FIG. 16 is a view depicting an embodiment of a combination shock absorber-auxiliary spring according to the invention. The piston is fixed on the rod, the pressurized gas is enclosed in the jack between the piston and a floating chamber traversed by the rod of the shock absorber, the electrovalve is integrated in the body of the jack and actuated by a solenoid.

Figure 17:
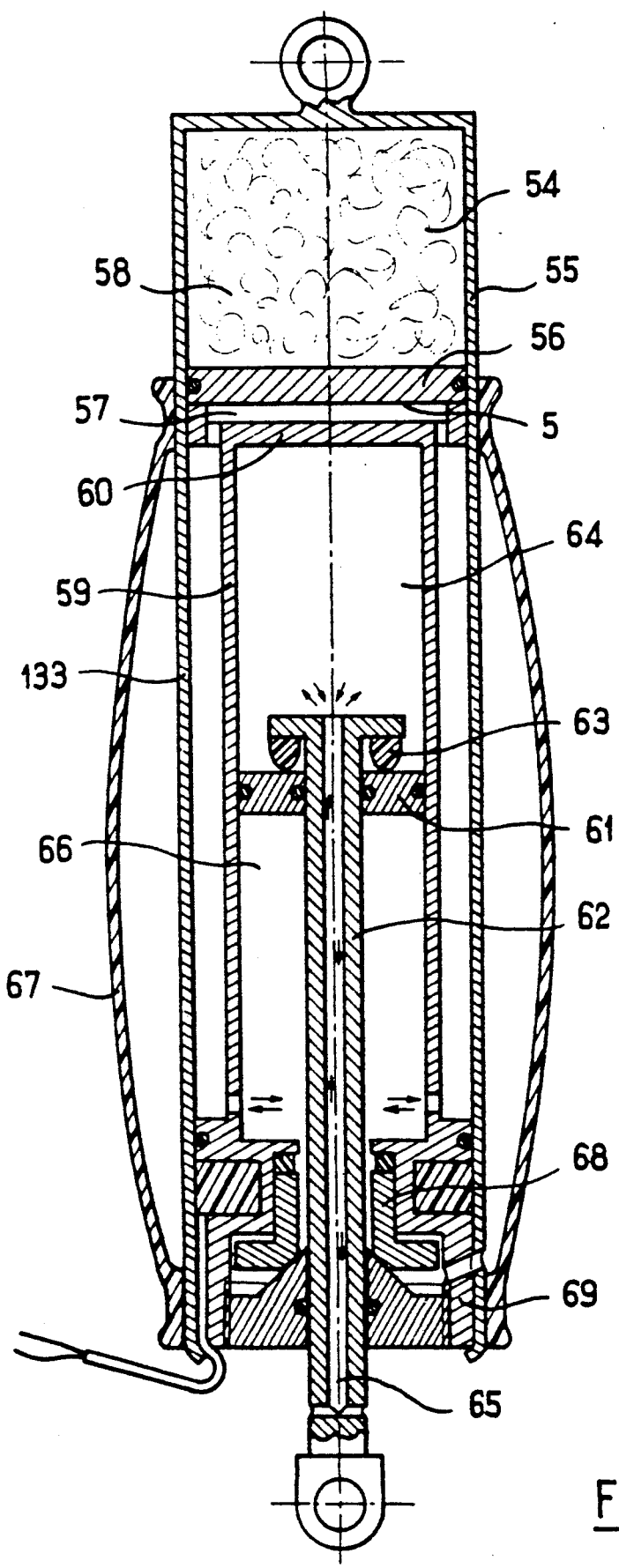
Figure 18:
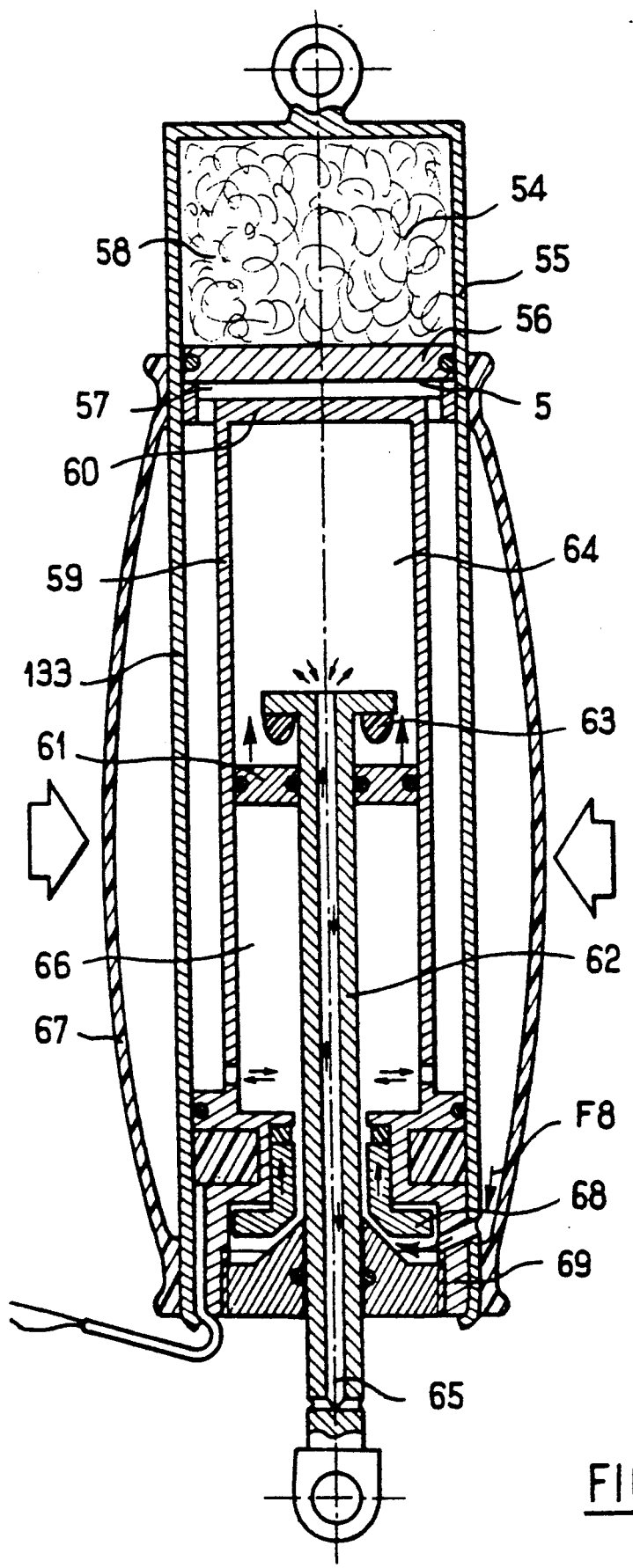
Figure 19:
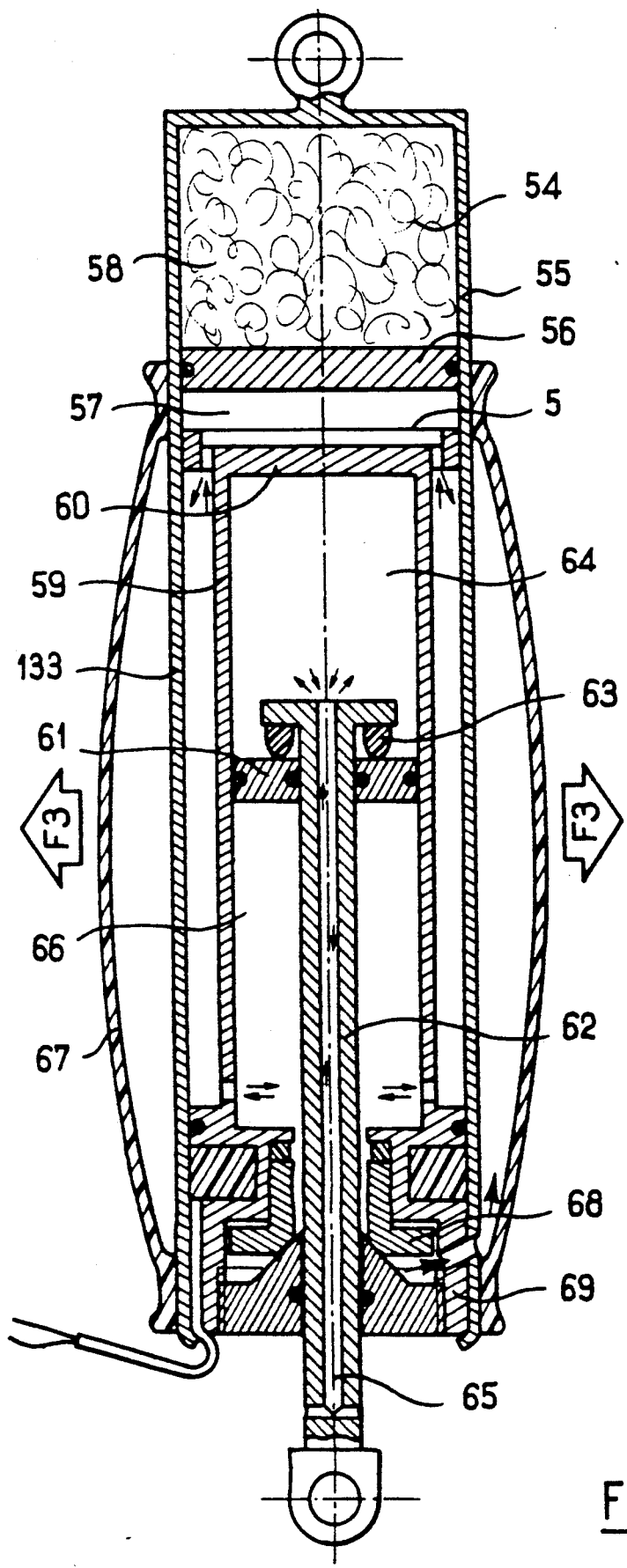

FIGS. 17, 18 and 19 depict an auxiliary oleopneumatic spring with automatic correction of the point of attack set off by electromagnetic command. This embodiment is mounted supplemental to and in parallel with the original suspension elements of the vehicle.

Figure 20:
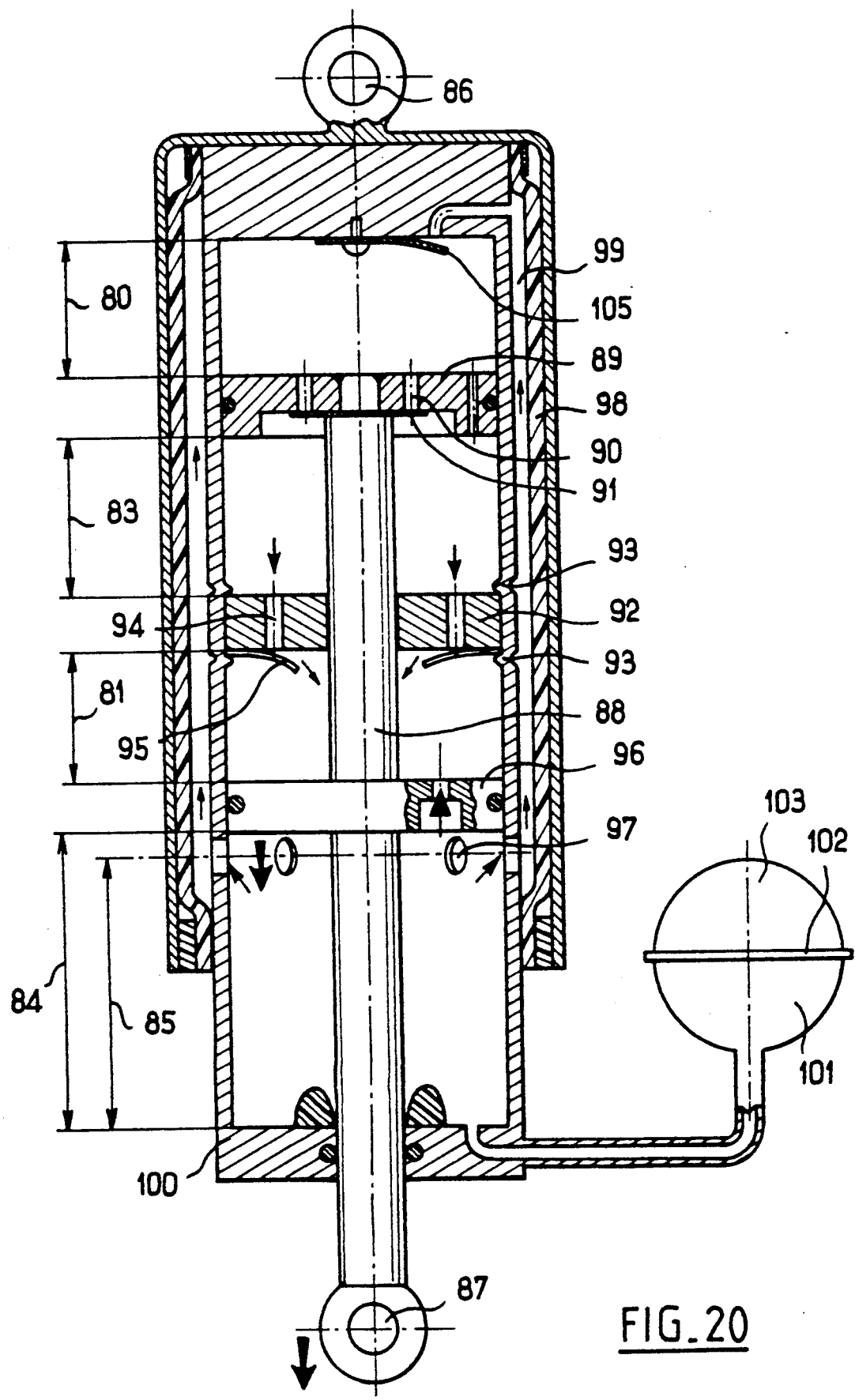
Figure 21:
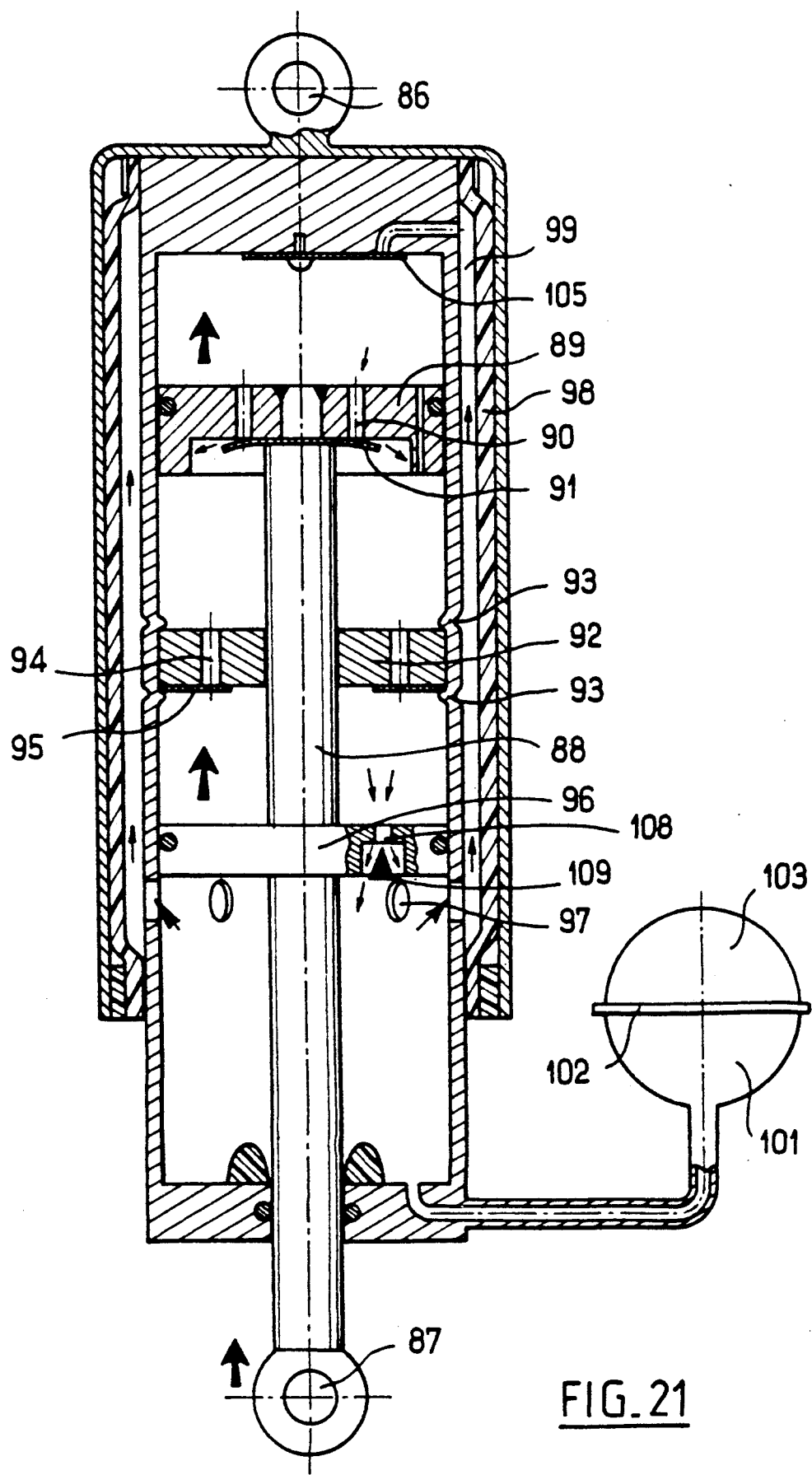
Figure 22:
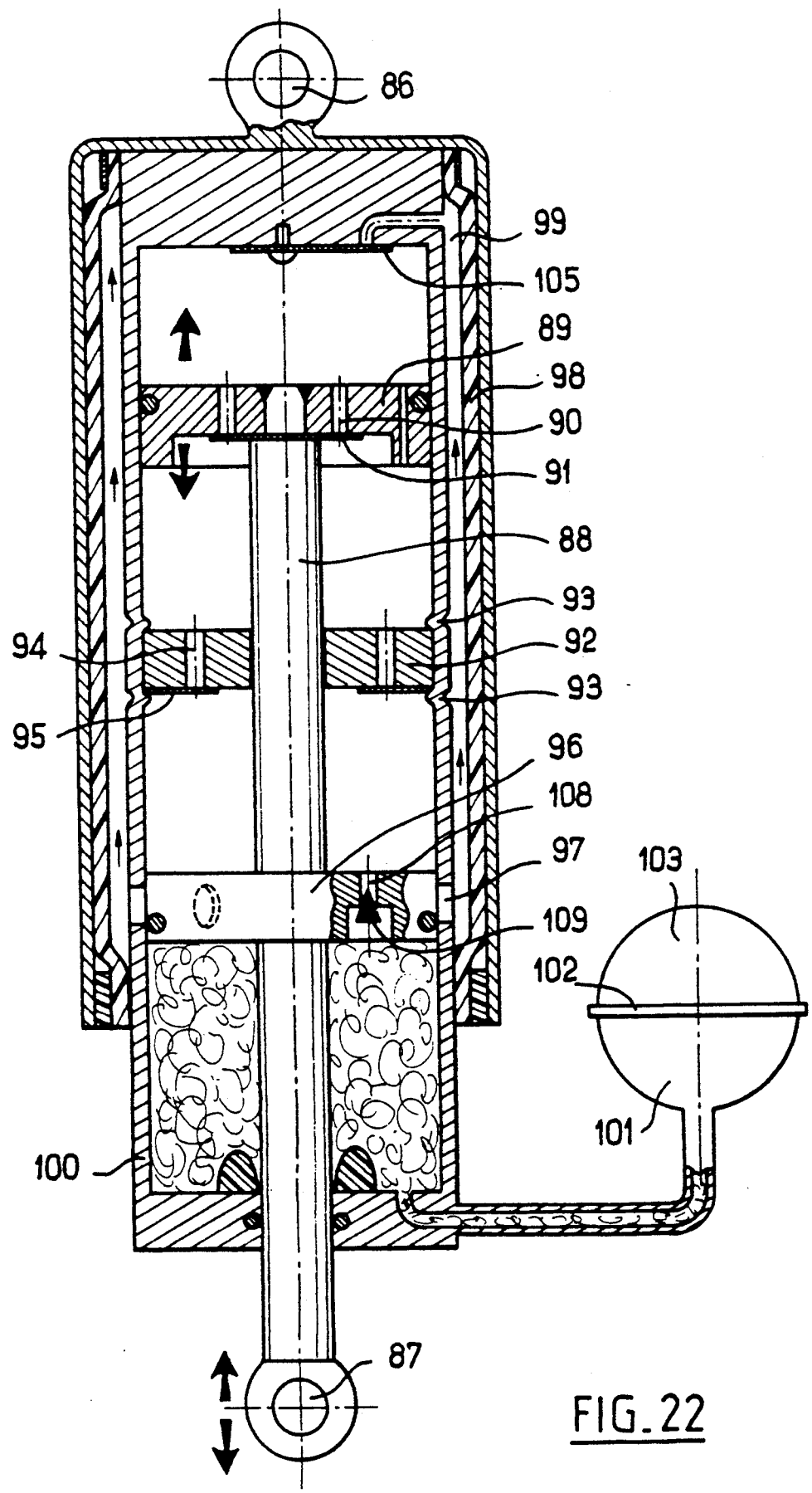

FIGS. 20, 21 and 22 are relative to an embodiment which rejoins the functions of the shock absorber and the auxiliary spring. This embodiment is not equipped with a correction of the point of attack of the auxiliary spring. It utilizes an oleopneumatic and telescopic shock absorber. It is pressurized by an oleopneumatic accumulator which equally serves as an auxiliary spring.

Figure 23:
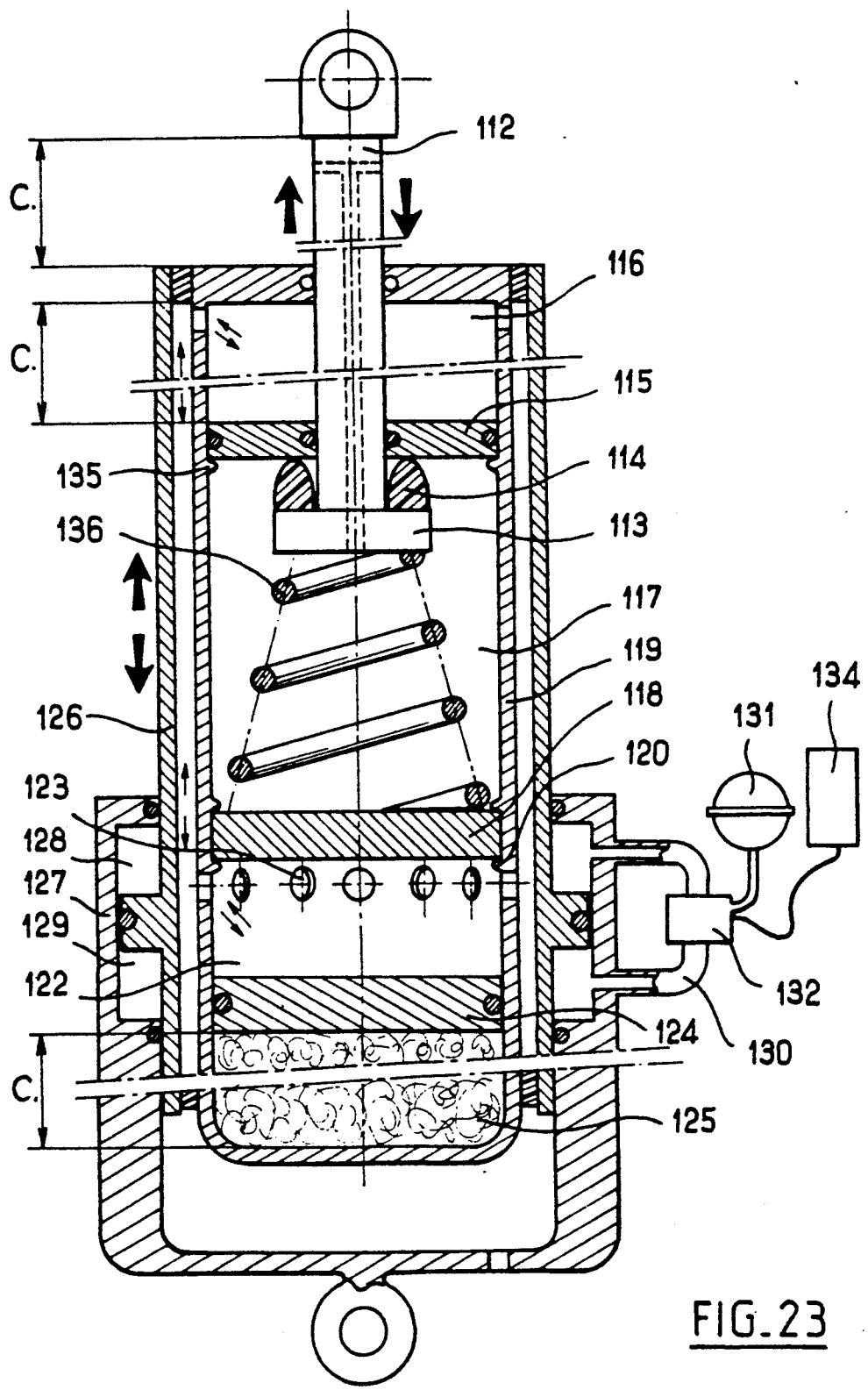

FIG. 23 schematically depicts another embodiment of an additional auxiliary spring with a classical suspension utilizing two oleopneumatic jacks. One jack acts as an auxiliary spring and the other jack has a regulating means for the shock absorption as a function of the load.

The suspension "CONTRACTIVE" (trademark), which is the object of the two previously cited patent applications, proposes, as a principal characteristic to equip the vehicle on which it is installed, with a suspension in which the stiffness is greater in the region between the position "operating load" and a position "suspended wheels" than in the range between the position "operating load" and a position "collapsed suspension" up to shock abutment. To simplify, the suspension CONTRACTIVE is characterized by the existence of a stiffness greater in the region of "rebound" than in the region of "bump". When these are graphically represented, one can observe a change of thickness which is represented by a break in the slope.

This break in the slope, located in the neighborhood of the "operating load" position is the remarkable behavioral attitude which the CONTRACTIVE suspension originally conveys to the vehicle so equipped.

Nevertheless two problems have appeared since the first experimentation of this innovative suspension process:

1—the operation of the suspension in a riding zone and a threshold of two stiffnesses can generate a deterioration of comfort each time that one enters the zone of strong stiffness (trepidation, motoring noise . . . )

2—the reference position in the "operating load" depends upon the number of persons and the quantity of load that the vehicle is transporting (when it is not equipped with a plate correction device).

The different solutions to these problems are described hereinbelow.

I—SMOOTHING OF THE BREAK IN THE SLOPE

The simple solution consists in mounting in series with the auxiliary spring R2, an additional elastic element 1 which acts as an additional progressive abutment whose stiffness increases rapidly towards an asymptotic value.

Figure 1:
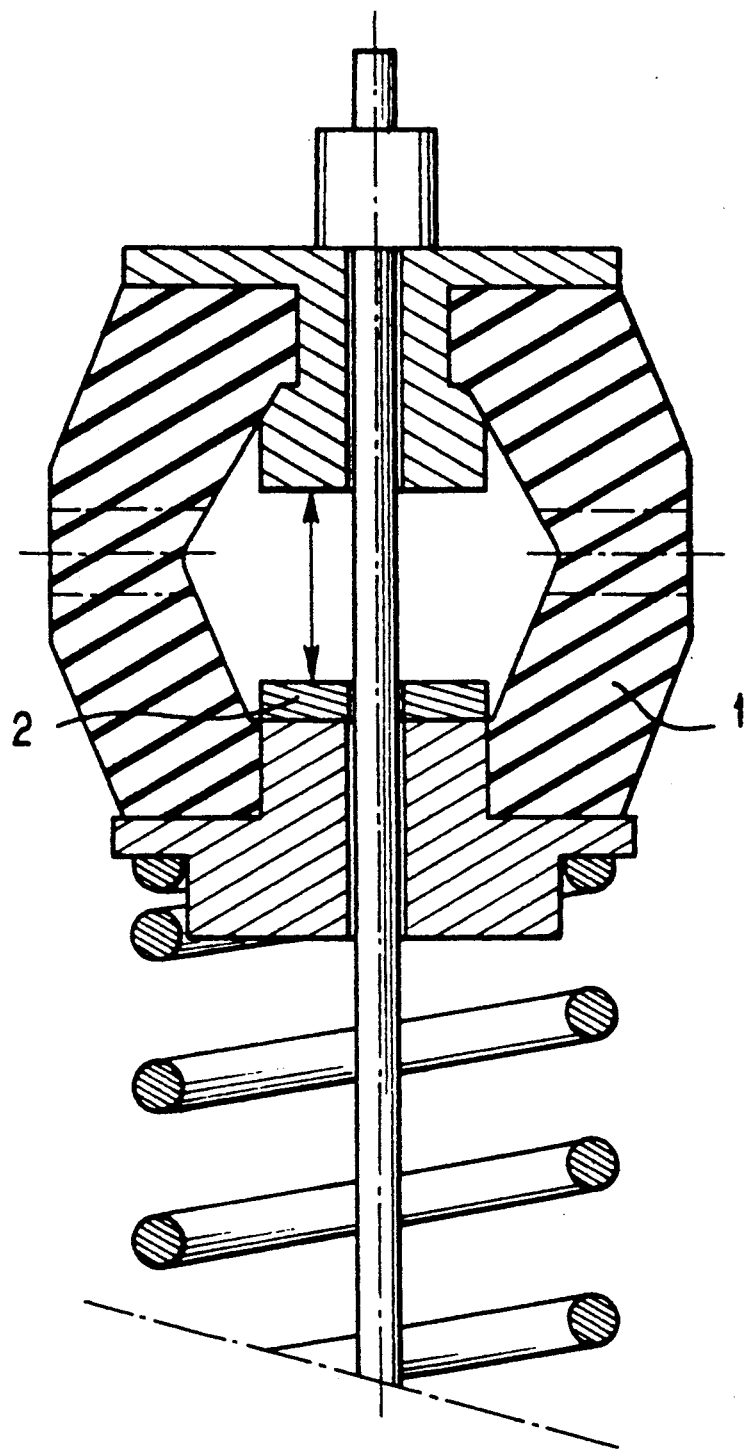
FIG. 1 is a schematic view of a means for smoothing the passage from one stiffness to the other, said means is an elastic ring mounted in series with the additional spring of the suspension according to the invention.
Figure 2:
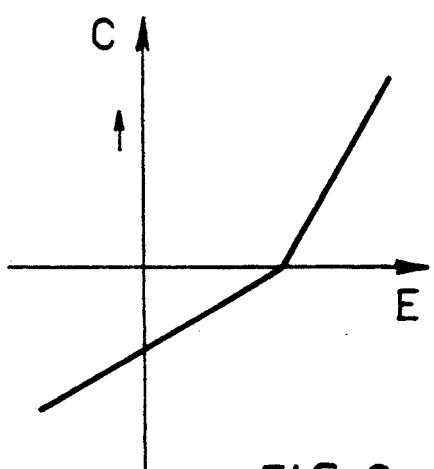
FIGS. 2 through 6 depict stiffness curves.
Figure 3:
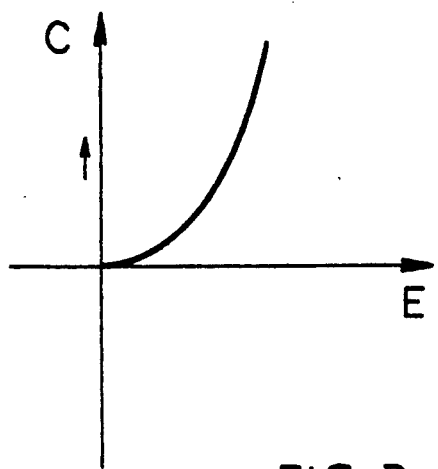

FIG. 1 represents an experimental solution utilized with the prototypes and which makes use of an additional elastic element 1. To better control the parameters of this embodiment, this assembly is equipped with an internal abutment 2 to the additional elastic element, which defines the exact path of intervention of the latter.

In this embodiment, the additional elastic element is a rubber support ring.

In addition, during the research of the operation it is easy to vary the stiffness of the annular rubber support ring by piercing it horizontally in its median portion.

In the assemblies ultimately destined for an industrial scale, the additional progressive abutments bearing on the auxiliary spring are equipped with a stiffness curve having a proper asymptote.

Figure 4:
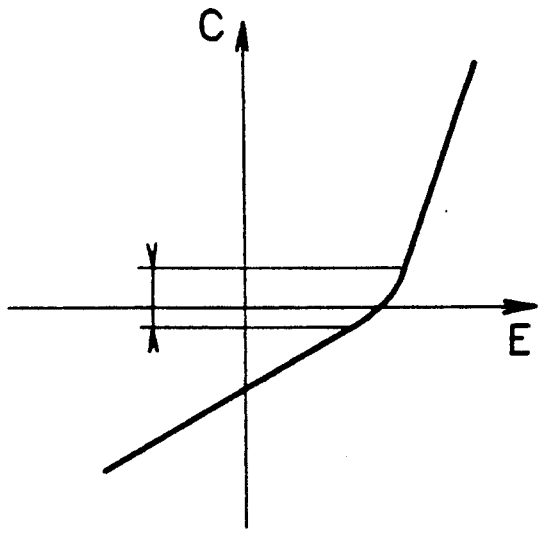

FIGS. 2 through 6 depict the stiffness curves:
of an arrangement based with two springs (FIG. 2)
of the type of a progressive abutment to be used (FIG. 3)
of an assembly equipped with a progressive abutment (FIG. 4)

On these curves:
C represents the path, the direction of the compression
E represents the work
The curve represents the stiffness curve.

Figure 5:
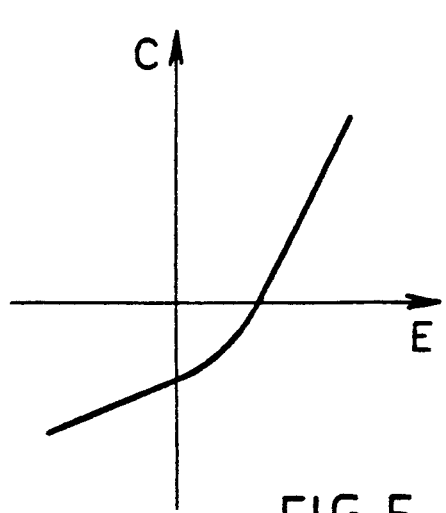

An efficient solution for protecting the comfort provided by the original suspension of the vehicle or for improving it consists in utilizing an auxiliary spring with variable flexibility (FIG. 5). This will practically be the case of the springs of the pneumatic and oleopneumatic type. A compromise could be obtained by establishing an initial pressure in the elastic element. One would then observe a break in the curve nevertheless not as severe as in the case where two mechanical springs are used (FIG. 6). These arrangements meet the concern of safeguarding the comfort aspect of the vehicle whereas the basic solution, without rounding off the break point of the stiffness curve, is more directed towards the quest for proper handling, which is the case in sport vehicles.

II—ACCOUNTING FOR LOAD VARIATION

"Rounded off" or not, it is the position of the break point of the stiffness curve of the suspension which characterizes the behavior of the vehicle equipped with the CONTRACTIVE suspension. This positioning is difficult to define when the suspension is supple and when the load on the axle is variable. The problem will then be more pronounced on the vehicles with the larger seating capacity, whereas a sport vehicle with two seats and having a suspension less supple will be easier to treat.

In fact, it is essential to have the possibility of adjusting this break point in the stiffness curve during each of the load variations of the vehicle.

Two possibilities are offered:

1. Intervention on the supporting springs of the vehicle. Otherwise stated "correction plate". Many French vehicles are already equipped with the same: this is the case of vehicles with oleopneumatic suspension. The majority of laborers actually work on this subject researching auxiliary equipment for the suspension (principally vehicles having high clearance). It goes without saying that the implementation of the CONTRACTIVE suspension on vehicles already equipped with a correction plate device is then greatly facilitated.

2. Intervention on the auxiliary springs of the CONTRACTIVE suspension. Different possibilities are apparent. The solutions which are described below all make use of liquid and gaseous fluids.

Hereafter are described purely mechanical (and electrical) solutions for obtaining the same results.

FIG. 7 is a view of an embodiment for the automatic correction of the attack point of the auxiliary spring R2, in a manner to readjust a prestressed suspension as a function of the load, in other words, to adjust the break point of stiffness during each of the variations of the load of the vehicle.

The two springs R1, R2 bear on the chassis at 4.

The regulating means is a hydraulic jack 3, placed in "interface" between the movable part 17 of the spring RI of the suspension 106 and the auxiliary spring R2.

The head 6 of the movable piston 9 is secured to the suspension 106 whereas the body of the jack 3 bears on the auxiliary spring R2. The two upper chambers 7 and lower chambers 8 of the movable piston 9 intercommunicate with one another via a passageway 10 where the flow is controlled by electrovalve 11. The jack 3 is equipped, in its upper part, with a gas reservoir 12, compressed gas such as nitrogen, which maintains the oil being utilized under pressure, with the help of a floating separator 13.

When the electrovalve 11 is closed, the two chambers 7 and 8 are isolated and their respective volume cannot be varied. The movable piston 9 is freely mounted on the rod 14 and it does not secure itself until the descending movement of the rod with the help of the progressive abutment 15.

During these descending movements, the rod 14 can then penetrate the jack 3, which only serves to push back the floating separator 13 of a value corresponding to the volume of oil displaced by the penetration of the rod 14.

When the assembly is still (stopped vehicle), if the electrovalve 11 is open, the movable piston 9 rises and comes in contact with the abutment 15 of the rod 14 under the effect of the bearing spring 16 (see FIGS. 8 and 9), this bearing spring 16 finds itself just below the movable piston 9. It suffices then to close the electrovalve 11 so that the jack 3 locks itself and that the movement of the rod 14 during the displacements of the suspension in the direction of expansion, entirely drags the jack 3, thereby transmitting the push of the suspension on the auxiliary spring R2.

The electrovalve 11 is then designed to remain closed during the utilization of the vehicle. However, before moving, during loading (or unloading of the vehicle), the electrovalve 11 is opened during the time where the movable piston 9 bears on the abutment 15 of the rod 14.

One will observe that this system permits the automatic repositioning of the intervention point of the auxiliary spring R2 no matter what the load is (even posture) of the vehicle.

In FIG. 8 it is evident that the rod 14 sinks into the jack 3. The movable piston 9 is no longer bearing against the abutment 15 of the rod 6. The arrows Fl of the rod indicate the sinking into the body as well as the role of the reserve gas 12 which assures that a permanent oil pressure is maintained in the jack assembly.

In FIG. 9, when the electrovalve is open, the two chambers 7 and 8 communicate which permits movable piston 9 to bear against abutment 15, it suffices then to close the electrovalve for the suspension assembly to become functional and until future variation of the load of the vehicle.

FIGS. 10, 11 and 12 depict an embodiment where the auxiliary spring R2 is mounted coaxially with a jack 18. One will find the jack 18 which is mounted in "interface" between the movable party 107 of the suspension or of the suspension spring R1 and the auxiliary spring R2. The two springs bear on the chassis at 19.

The jack 18 is comprised of two chambers, an upper chamber 20 and a lower chamber 21. These two chambers intercommunicate between each other by a passageway 22 controlled by electrovalve 23. A reserve of compressed gas 24 is disposed in the upper part of the jack 18 separated from the lower chamber 20 by a movable floor 25. A bearing spring 26 is located in the lower chamber 21 between the movable piston 27 in contact with one end of the abutment 28 of the rod 29 and the fixed floor 135 of the jack 18.

As shown in FIG. 11, when the vehicle is loaded, the arrow F3 indicates the push which permits the penetration of the rod 29, as indicated by arrow F4. This rod 29 penetrates into the body of the jack 18.

As shown at FIG. 12, as soon as the electrovalve 23 is opened, the movable piston 27, thanks to the bearing spring 26, comes to bear against one end of the abutment 28 at the head of the rod 29. At this stage, it suffices to close the electrovalve 23 for the suspension to become operational.

FIGS. 13, 14 and 15 depict another embodiment where the process is combined with a shock absorber having an auxiliary spring according to the invention with automatic correction means of the point of attack.

This embodiment utilizes a hydraulic jack 30 having a shock absorber assembly 34 and auxiliary spring R2.

This embodiment can be utilized on vehicles where the shock absorber is very distinctively equipped with the elastic element, for example on a rear drive and torsion bars. The body of the jack 30 is supported by a casing 31 which carries the abutment 32 on which bears the auxiliary spring R2. This auxiliary spring R2 is supported at its other end by a bearing abutment 33 of the body of the shock absorber 34. The piston 35 of the jack is supported on the rod 36 of the shock absorber 34. An internal bearing spring 37 tends to raise the body of the jack 30, hence the assembly of the jack body and casing 31, relative to the piston 35, hence relative to the rod 36 of the shock absorber 34. A small pressurization element (accumulator) 38 continuously ensures the complete filling of the jack 30.

For the operation of this embodiment, the upper chamber 39 and the lower chamber 40 on either side of the piston 35 fixed on the rod 36 intercommunicate by passageway 104 controlled by an electrovalve 41.

The shock absorber 34 is fixed at 42 to the chassis and at 43 on the suspension arms. The operation of this apparatus resembles in all points the apparatus previously described.

FIGS. 14 and 15 describe the operation of this embodiment.

As soon as the vehicle is loaded, the user actuates the communicating electrovalve 41 in such a manner that the spring R2 comes to bear and that there is no air gap 44 between the end of the auxiliary spring R2 and the bearing abutment 33 supported by the shock absorber 34.

FIG. 14 depicts the assembly where the body of the jack 30 and its casing 31 sink in the direction show by arrow F5 around the body of the shock absorber 34 thereby liberating the auxiliary spring R2 from its bearing abutment 33, which abutment is fixed to the body of the shock absorber 34.

After loading the vehicle, it is sufficient to open the electrovalve 41 as indicated in FIG. 15 so that thanks to the bearing spring 37 the assembly of jack body 30 and casing 31 rise to retake its initial position as indicated in dotted lines on FIG. 14 (see the arrow F6) and it is in this manner that the spring R2 no longer has an air gap 44 between its upper end and the bearing abutment 33 supported by the body of the shock absorber 34; it suffices then to close the electrovalve 41 until a new modification of the load of the vehicle.

FIG. 16 depicts another embodiment; one has utilized in combination a shock absorber and an auxiliary spring according to the invention.

In this FIG. 16, the pressurization gas 45 is enclosed in the body of the jack 46 between the piston 47 and a floating chamber 48 traversed by the rod 49 of the shock absorber 34.

Electrovalve 50 is integrated in the body of the jack 46 in the form of a valve member 50 held in abutment on its seat by an O-ring 51 which serves as a joint and a retention spring for said valve member 50. This valve member 50 leaves its seat, when the solenoid 52 which is situated below, is actuated; the oil can then move as indicated by the arrows F7 in FIG. 16, between the top and bottom of the jack 46 making use of the annular space 53 peripheral to the jack 46. When the solenoid 52 is not actuated, the valve member 50 stays closed and the jack 56 is locked; for the rest of this operation, this embodiment operates as previously described.

Certain reference numerals have been preserved where they refer to the same previously described functions, in particular the casing 31, the bearing abutment 33 supported by the shock absorber body 34, and the auxiliary spring R2.

The embodiment depicted in FIGS. 17, 18 and 19 relates to an auxiliary oleopneumatic spring according to the invention and equipped with automatic correction means of the point of attack. This embodiment can only be utilized if it is possible to mount it in addition to and in parallel with the original suspension elements of the vehicle.

Practicing the invention with a telescopic shock absorber, it possesses a volume of compressed gas 54 in its upper part 55 between the body of the apparatus and a movable floor 56 for separating the oil 57 and the gas 58.

This movable floor, when at rest, bears against apex of the interior tube 59, which is itself closed by a fixed partition 60.

In this interior tube 59, one can find a free piston 61 identical to those previously described. The rod 62 of the apparatus also bears on the piston 61 via a progressive abutment 63. The upper side of the piston is in a zone of atmospheric pressure 64 (maintained by the hollow rod 62 which holds a depressurization conduit 65 from the center of the apparatus), whereas the lower face of the piston 61 bears against the oil 66 under slight pressure by the elasticity of elastomeric casing 67, when an electrovalve 68 placed at the foot 69 of the apparatus opens the communication between the interior of the apparatus and the volume contained between the elastic casing 67 and the exterior of said apparatus.

The oil 66 contained below the piston 61 can flow between the two tubes 59, 133 to the chamber which is located between the upper movable floor 56 and the fixed floor 60 which closes the top internal tube 59. In this manner, when the piston 61 descends, by the transfer of this oil, the gas 58 in the upper portion will be compressed by the rise of the movable floor 56 which separates it from the oil 57 or 66.

Utilizing the same principle as the embodiments previously described, when the vehicle is stopped and at the end of a variation of load, one opens electrovalve 68 in order to permit the oil to travel between the elastomeric casing 67 and the interior of the apparatus (see the arrows F8), the floating piston 61 then comes to rest against the progressive abutment 63. The electrovalve 68 is closed once again, the volume of internal oil remains unchanged and defines the position of the piston 61.

When the suspension is compressed, the rod 62 penetrates into the apparatus as depicted in FIG. 18. The said rod 62 penetrates the apparatus thereby expelling a little bit of air from above the piston 61 without endangering the transfer of oil. By contrast, when the suspension is expanded, the piston 61 is urged with the help of the progressive abutment 63 and the bias of the transfer of oil, the gas 58 in the upper part 55 is compressed thereby ensuring the function of the spring with variable flexibility.

The embodiment depicted in FIGS. 20, 21 and 22 deals with the arrangement combining the functions of shock absorber and auxiliary spring. This combination is not equipped with a correction of the point of attack of the auxiliary spring, its principle of operation confers to it a length which limits its applicability. Nevertheless, its use is perfectly appropriate for front wheel drive vehicles of the MAC PHERSON type (in a recoiled position) where the length is not a constraining factor. In addition, the variations of the load on the front end are much more inferior to those on the rear axle, which permits dispensing with the correction of the point of attack.

The apparatus according to the embodiment functions with the continuous circulation of air, it is pressurized by an oleopneumatic accumulator 102 which equally acts as an auxiliary spring. This shock absorbing function is localized in the upper part. In this embodiment, 80, 81, 82 represent the path of shocks, 83 and 84 the paths of rebound, and 85 the zone of antagonist stiffness.

This embodiment is of the telescopic shock absorber type. The upper point permits the fixing to the chassis at 86 and the lower point permits the fixing to the suspension arms at 87 by the rod 88.

A movable piston 89 which comprises adjustment orifices 90 and valve members 91 is fixedly mounted on the rod 88. This assembly of orifices and valve members acts as a shock absorber to the bumps. In the middle of the jack body is disposed a fixed floor 92 which is retained by internal shoulders 93 of the body of the jack. This fixed floor 92 acts as a shock absorber to the "rebound" and also comprises an assembly of orifices 94 and valve members 95. A last piston 96 is mounted in the lower part of the jack supported by the rod 88. This movable piston 96 can register with orifices 97 which permit the oil to circulate towards an oil reservoir 99 disposed coaxially to the jack body and retained by an elastomeric skirt 98; this oil reservoir 99 permits the transfer into the accumulator during the phases where the suspension CONTRACTIVE is operating.

The lower part of the jack 100 is connected to an oleopneumatic accumulator 102, a part of which contains the compressed gas 103 and the other part the oil 101.

As shown in FIG. 20, the apparatus is in an expansion mode of the shock absorber. The oil is compressed between the piston 89 (where the valve members 91 have closed the orifices 90) and the fixed floor 92, which brings in the oil into its orifices 94 all while opposing the elasticity of its valve members 95.

FIG. 21 depicts the apparatus in a bump mode of the shock absorber. The oil is compressed between the upper part of the apparatus where the passage of the oil has been blocked by the valve member 105 and a movable piston 89 which brings in the oil into its orifices 90 all while opposing the elasticity of its valve members 91. Simultaneously the oil contained between the floor 92 and the piston 96 traverses the latter via passageway 108 in which the valve 109 has opened.

FIG. 22 depicts the apparatus in a "CONTRACTIVE phase". The piston 96 while descending has gone beyond the orifice line 97; the valve member 109 obstructs the passageway 108. The oil contained under the piston 96 is then sent into the accumulator 102 which generates the "contracting work" on the rod of the apparatus.

The embodiment depicted in FIG. 23 concerns an apparatus of the type shown in FIG. 17 but in which the correction necessitated by the load variations carried out by an annular jack.

As in the apparatus depicted in FIG. 17, the rod 112 is hollow to permit the pressurization of the volume 117 into atmospheric pressure. During the path of shock, the rod introduces itself into the apparatus whereas the movable piston 115 bears on the abutment 135. During the path of expansion, the movable piston 115 is drawn along by the rod 112 and the abutment 114. The oil is expelled from volume 116 toward volume 122 using the annular space between the tubes 119 and 126 which brings about the displacement of the movable floor 124 and the compression of the gas contained in 125. This gives rise to the "contracting work".

The cylindrical tube 126 acts as piston in the body of the jack 127. It defines two chambers 128, 129. These two chambers 128, 129 intercommunicate between one another by passageway 130 provided with an oleopneumatic reservoir 131 and actuated by an electrovalve 132.

This assembly permits regulation of the apparatus as a function of the load of the vehicle.

During the opening of the electrovalve 132, the two volumes 128 and 129 are placed in free communication, which permits the apparatus to reposition itself with the free piston 115 bearing on the abutment 135 under the effect of the internal pressure of the apparatus while the end of the rod 113 is placed in contact with piston 115 under the effect of the return spring 136.

This embodiment can be provided with an accelerometer 134 which controls the valve member or electrovalve 132 and closes said valve member with each horizontal acceleration of the vehicle.

The operation of this embodiment is analogous to those previously described.

REFERENCES 1. rubber support of revolution
2. internal abutment
3. hydraulic body
4. support on the chassis
5. apex of the interior tube 59
6. head of the piston
7. upper chamber
8. lower chamber
9. movable piston
10. passageway
11. electrovalve
12. gas reservoir
13. floating separator
14. rod
15. bearing progressive abutment
16. bearing spring
17. movable portion of the suspension spring
18. jack
19. support on the chassis
20. upper chamber
21. lower chamber
22. passageway
23. electrovalve
24. gas reservoir
25. movable floor
26. bearing spring
27. movable piston
28. end of abutment
29. rod
30. hydraulic jack
31. carrying casing
32. abutment
33. bearing abutment
34. shock absorber
35. fixed piston of jack 30
36. rod of the shock absorber
37. bearing spring
38. pressurization element
39. upper chamber
40. lower chamber
41. communicating electrovalve
42. fixing point of the shock absorber to the chassis
43. fixing point of the shock absorber on the arm
44. air gap
45. pressurization gas
46. jack
47. piston
48. floating chamber
49. shock absorbing rod
50. electrovalve or valve member
51. O-ring
52. solenoid
53. peripheral annular space
54. gas volume
55. upper part of compressed gas
56. movable floor
57. oil
58. gas
59. interior tube
60. fixed partition
61. free piston
62. rod
63. progressive abutment
64. zone with atmospheric pressure
65. conduit
66. oil
67. elastomeric casing
68. electrovalve
80. 81. 82. paths of shocks
83, 84. paths of rebound
85. zone of antagonistic thickness
86. chassis fixing point
87. lower fixing point
88. rod
89. movable piston
90. adjustment orifices
91. valve member
92. fixed floor
93. shoulder
94. orifice nozzle assembly
95. valve member
96. piston
97. orifices
98. elastomeric skirt
99. oil reservoir
100. jack
101. oil
102. oleopneumatic accumulator
103. compressed gas
104. passageway
105. upper valve member
106. suspension
107. movable part of the suspension
108. oil passageway
109. valve member
112. rod
113. head
114. progressive abutment
115. movable piston
116. volume
117. volume
118. separating wall
119. tube
120, 121. shoulders
122. volume
123. orifices
124. movable floor
125. gas chamber
126. tube
127. jack
128, 129. chambers
130. passageway
131. oleopneumatic reservoir
132. electrovalve
133. tube
134. accelerometer
135. bearing abutment
136. return spring
P1, P2. pressure
R1. suspension spring
R2. auxiliary spring P1 through F8. arrows

I claim:

1. A suspension process for the wheels of a motor vehicle having a wheel suspension having an operating load position in which the suspension is deformed by a force equal to the weight of the vehicle, a suspended wheel position in which the suspension is deformed by a force less than the weight of the vehicle and a collapsed position in which the suspension is deformed by a force greater than the weight of the vehicle, the process comprising providing the suspension with a stiffness that is greater between said operating load position and said suspended wheels position than between said operating load position and said collapsed position, said providing a gradual transition between said stiffnesses.

2. A process as claimed in claim 1, and providing a change of said stiffness for each variation of load of the vehicle, and changing gradually from one said stiffness to each other said stiffness.

3. A suspension for the wheels of a motor vehicle, said suspension having an operating load position in which the suspension is deformed by a force equal to the weight of the vehicle, a suspended wheel position in which the suspension is deformed by a force less than the weight of the vehicle and a collapsed position in which the suspension is deformed by a force greater than the weight of the vehicle, means providing the suspension with a stiffness that is greater between said operating load position and said suspended wheels position than between said operating load position and said collapsed position, and means providing a gradual transition between said stiffnesses.

4. A process as claimed in claim 1, and means providing a change of said stiffness of each variation of load of the vehicle, and means changing gradually from one said stiffness to each other said stiffness.

5. Suspension according to claim 3, there being mounted in series with an auxiliary spring (R2), an additional resilient element (1) serving as an additional progressive abutment whose stiffness increases rapidly toward an asymptotic value; there being also an internal abutment (2) for the resilient element (1) which defines the exact course of intervention of this latter.

6. Suspension according to claim 5 the additional resilient element (1) is a rubber support which is a figure of revolution.

7. Suspension according to claim 3 wherein the rounding off means of the break in the curve, corresponding graphically to the change of stiffnesses, comprises an auxiliary spring of variable flexibility.

8. Suspension according to claim 3, wherein control means to adjust the break of the curve, corresponding graphically to the change of the stiffnesses, during each of the variations of load of the vehicle in the case in which there are used two springs of which one is a principal sustentation spring (R1) and the other is an auxiliary spring (R2) mounted in opposition, is a hydraulic jack (3) disposed as an interface between a movable portion (17) of the principal spring (R1) of the suspension (106) and the auxiliary spring (R2).

9. Suspension according to claim 8 wherein a rod of a movable piston (9) is secured to the suspension (106) while a body of the jack (3) bears on the auxiliary spring (R2), the jack (3) is provided with two upper (7) and lower (8) chambers on the movable piston (9) which intercommunicate by a passageway (10) through which the passage of oil is controlled by an electrovalve (11), the jack (3) comprises, in its upper portion, a compressed gas reservoir (12) maintaining the oil used under pressure by means of a separate floating piston (13) disposed between this reservoir (12) and the upper chamber (7); the lower chamber (8) contains a bearing spring (16), the head (6) of the piston (9) is freely mounted on a piston (14) which comprises at one end an abutment (15) which serves as an abutment for progressively applying bearing force.

10. Suspension according to claim 9 wherein an electrovalve (11) opens the oil passage between the two chambers (7, 8) to permit adjustment after loading such that the piston (9) will bear against the abutment (15) of the rod (14) and wherein the electrovalve (11) is closed during travel.

11. Suspension according to claim 9 wherein auxiliary spring (R2), mounted in opposition to the principal sustentation spring (R1), is mounted coaxially with a hydraulic jack (18) which is disposed at an interface between a movable portion (107) of the principal or of the suspension spring (R1) and the auxiliary spring (R2).

12. Suspension according to claim 8, which combines a shock absorber with an auxiliary spring with automatic correction means for a point of attack; a body of a jack (30) being secured to a casing (31) carrying an abutment (32) on which comes into bearing relation one end of the auxiliary spring (R2); this auxiliary spring (R2) being secured, at its other end, to a bearing abutment (33) of a shock absorber (34); a piston (35) of the jack being secured to a rod (36) of the shock absorber (34); an internal bearing spring (37) tending to raise the body of the jack (30), hence the assembly of the jack and casing (31), relative to the piston (35), therefore relative to the rod (36) of the shock absorber (34); a small pressurization element (38) ensuring continuously the complete filing of the jack (30); the jack (30) being divided in two chambers separated by the piston (35) which is secured to the rod (36) of the shock absorber (34), the two chambers (30, 40) communicating through a passageway (104) which is controlled by a pressurization electrovalve (41), one said chamber (39) having a bearing spring (37), a pressurization element (38) being connected to the passageway (104) which connects the two chambers (39, 40) such that the assembly of the jack (30) and casing (31) of the auxiliary spring (R2) is displaced by the abutment spring (37) upon opening of the electrovalve (41) for adjustment as a function of the load.

13. Suspension according to claim 4, comprising in combination a shock absorber and an auxiliary spring; there being a pressurization gas (45) enclosed in a body of a jack (46) between a piston (47) and a floating piston (48), traversed by a rod (49) of the shock absorber (39), an electrovalve (50) integrated in the body of the jack (46) in the form of a valve member (50) held in abutment on a seat by an O-ring (51) which serves as a joint and spring for holding said valve (50); said valve (50) leaves its seat when a solenoid (52) is actuated; whereupon oil can then move, between the top and bottom of the jack (46), making use of an annular space (53) peripheral to the jack (46); but when the solenoid (52) is not actuated, the valve member (50) remains closed and the jack (46) is locked.

14. Suspension according to claim 4, comprising an auxiliary suspension spring of oleopneumatic type and provided with an automatic correction means of the point of attack mounted supplemental to and in parallel with basic suspension elements of the vehicle.

15. Suspension according to claim 14 which is of the telescopic shock absorber type and has a volume of gas (54) compressed in its upper portion (55) between a body of the apparatus and a movable piston for separating oil (57) and gas (58); this movable piston (56), at rest, bearing on a summit (5) of an internal tube (59), itself closed by a fixed partition (60); this internal tube (59) comprising a piston (61) which is free relative to a rod (62) which also serves as a depressurization conduit for the center of the apparatus; the rod (62) of the apparatus also being on the piston (61) via a progressive abutment (63); the upper side of the piston (61) being in an atmospheric pressure region (64) (provided by the hollow rod (62) which comprises a conduit (65) for depressurization of the center of the apparatus, while the lower surface of the piston (61) bears on the oil (66) under slight pressure from the elasticity of a casing (67) of elastomer, when an electrovalve (68) disposed in the base (69) of the apparatus opens the communication between the interior of the apparatus and the volume contained between the elastic casing (67) and the exterior of said apparatus; the oil (66) contained below the piston (61) can flow between tubes (59, 133) to the chamber which is located between the upper movable piston (56) and the fixed piston (60) which closes the top of the internal tube (59); when the piston (61) descends by transfer of this oil, the gas (58) in the upper part will be compressed by the rise of the movable piston (56) which separates it from the oil (57) or (66).

16. Suspension according to claim 3, which is of the telescopic shock absorber type; having an upper point that permits securement (at 86) to a chassis of the vehicle and a lower securement point (87) that permits securement to a suspension arm by a rod (88); the rod (88) having a movable piston (89) fixed on the rod (88), the movable piston (89) comprising adjustment openings (90) and valve members (91) in the middle of the jack a fixed piston (92) which is retained by internal shoulders of the jack body and shoulders (93); this fixed piston (92) serving as a rebound shock absorber and comprising also an assembly of adjustments (94) and of valve members (95); a final piston (96) mounted in the lower portion of the jack, on the rod (88); this movable piston (96) being adapted to register with openings (97) which permit the oil to circulate toward an oil reservoir (99) disposed coaxially to the body of the jack and retained by an elastomeric skirt (98); this oil reservoir (99) permitting transfer of oil into the accumulator during the phases in which the CONTRACTIVE suspension operates.

17. Suspension according to claim 3, comprising also an annular jack, a rod (112) that is hollow to permit placing a volume (117) at atmospheric pressure; during the course of shock, the rod (112) entering the apparatus while the movable piston (115) remains in bearing relation on an abutment (135); during the path of expansion, the movable piston (115) is driven by the rod (112) and the abutment (114); the oil is expelled from the volume (116) toward a volume (122) using an annular space between the tubes (119) and (126), which effects displacement of a movable piston (124) and the compression of the gas (125); a cylindrical tube (126) in the form of a piston in the jack body (127) and defining two chambers (128, 129); these two chambers (128, 129) intercommunicating by a passageway (130) provided with an oleopneumatic reservoir (131) and controlled by an electrovalve (132).

18. Suspension according to claim 17 comprising also with an accelerometer (134) which controls the valve member or electrovalve (132) and blocks said valve member upon each horizontal acceleration of the vehicle.

* * * * *